US005997998A

United States Patent [19]

Sawamura

[11] Patent Number: 5,997,998

[45] Date of Patent: Dec. 7, 1999

[54] RESISTANCE ELEMENT

[75] Inventor: Kentaro Sawamura, Tokyo, Japan

[73] Assignee: TDK Corporation, Tokyo, Japan

[21] Appl. No.: 09/267,771

[22] Filed: Mar. 15, 1999

[30] Foreign Application Priority Data

Mar. 31, 1998 [JP] Japan .................................. 10-087451

[51] Int. Cl.$^6$ ........................................................ B32B 9/00

[52] U.S. Cl. .......................... 428/209; 428/210; 428/698; 428/701; 428/702; 338/254; 338/255; 174/255; 174/256; 174/257; 174/258; 361/765; 361/766

[58] Field of Search .................................... 428/209, 210, 428/698, 701, 702; 338/308, 314, 254, 255; 174/255–258, 260; 361/765, 766, 720, 748, 761

[56] References Cited

U.S. PATENT DOCUMENTS

| | | | |
|---|---|---|---|
| 4,187,344 | 2/1980 | Fredriksson | 428/304 |
| 4,652,727 | 3/1987 | Hoshizaki et al. | 219/541 |
| 4,912,305 | 3/1990 | Tatemasu et al. . | |
| 5,264,681 | 11/1993 | Nozaki et al. | 219/552 |
| 5,765,215 | 5/1998 | Sawamura et al. | 428/446 |
| 5,773,158 | 6/1998 | Sawamura et al. . | |

FOREIGN PATENT DOCUMENTS

| | | |
|---|---|---|
| 0 763 693 A1 | 3/1997 | European Pat. Off. . |
| 0 798 948 A2 | 10/1997 | European Pat. Off. . |
| 4 433505 A1 | 3/1995 | Germany . |
| 6-201128 | 7/1994 | Japan . |
| 2534847 | 6/1996 | Japan . |
| 2735721 | 1/1998 | Japan . |
| 2735725 | 1/1998 | Japan . |
| 10-50460 | 2/1998 | Japan . |
| 10-106728 | 4/1998 | Japan . |
| 2804393 | 7/1998 | Japan . |

*Primary Examiner*—Timothy Speer
*Assistant Examiner*—Bryant Young
*Attorney, Agent, or Firm*—Oblon, Spivak, McCelland, Maier & Neustadt, P.C.

[57] ABSTRACT

Concerning a resistance element comprising a laminated and sintered article of an insulating material substrate layer and a conductor layer formed on or embedded in the insulating material substrate layer, a material which is constituted of tungsten and carbon and has an atomic ratio of tungsten to carbon equal to 1:0.4 to 1:0.98 is used as said conductor layer. Such resistance element can be used at a temperature of 1400° C. or more and even further at a temperature of 1500° C. or more. The resistance element can increase its temperature rapidly to 1100° C. or more within about 3 seconds without any control circuit. The resistance element is a rapid temperature-rise resistance element with a high ignition performance constituted of ceramics with superior durability including resistance to repetitions of temperature increase and decrease, and resistance to oxidation at a high temperature.

4 Claims, 1 Drawing Sheet

RESISTANCE ELEMENT

BACKGROUND OF THE INVENTION

The present invention relates generally to a novel resistance element, and more particularly, it relates to a resistance element such as an electrifying type resistance element or a thermistor which can be rapidly heated up to 1100° C. or more within about 3 seconds without installing any control circuit applying a computer or the like and which is excellent in durability, i.e., which can withstand the repetition of the temperature rise and oxidation in a high temperature of about 1500 to 1550° C. in air and which can be used for the ignition of a gaseous fuel or a liquid fuel.

Heretofore, for the ignition of gaseous and liquid fuels such as natural gas, propane gas and kerosene, current-carrying type resistance elements made of ceramics are generally used.

In order to withstand such rapid temperature-rise as to reach 1000° C. or more within about 2 to 3 seconds and a high temperature of about 1500 to 1550° C. in air, this type of resistance element for the ignition is required to have excellent thermal shock resistance and oxidation resistance.

To meet such a requirement, conventional ceramics resistance elements have been normally manufactured by embedding a heating element such as tungsten or tungsten carbide in silicon nitride ($Si_3N_4$) and then sintering it.

In this case, however, silicon nitride can scarcely be sintered, and hence a rare-earth element is used as a sintering assistant to accomplish densification. However, when the rare-earth element is added, there occurs a problem that the oxidation resistance deteriorates at a temperature of 1400° C. or more. Therefore, in practice, the upper limit of the usable temperature is set to 1400° C., but when the rapid heating is carried out, a control circuit applying a computer or the like is required, which results in the increase of cost. In order to avoid such an increase of the cost, it is necessary to heighten the maximum reach temperature of the resistance element. In the conventional resistance element, however, it is difficult to further heighten the maximum reach temperature. In fact, in view of the cost and the oxidation resistance, a temperature-rise rate is unavoidably sacrificed.

In addition, a conductor layer which is used in the conventional resistance element is, for example, a heating element comprising tungsten or tungsten carbide mentioned above, but if a part of tungsten is silicified, there is a problem that the resistance of the conductor layer increases and its properties deteriorate.

SUMMARY OF THE INVENTION

The present invention has been developed under such circumstances, and an object of the present invention is to provide an electrifying type resistance element comprising ceramics and having a high ignition performance at a low cost which can be used at 1400° C. or more, further suitably at 1500° C. or more and which can be rapidly heated up to 1100° C. or more within about 3 seconds without installing any control circuit and which is excellent in durability, i.e., which can withstand the repetition of the heating and oxidation at a high temperature.

The present inventors, as a result of their wholehearted study for developing the resistance element having superior performance, have obtained the following knowledge capable of attaining said object and completed the present invention based on the knowledge:

In the resistance element comprising a laminated and sintered article of an insulating material substrate layer and a conductor layer formed on or embedded in the insulating material substrate layer, it is possible to obtain the resistance element having a change in a resistance of 10% or less, even after a cycle test which repeats 50000 times or more the operation of heating the element temperature up to 1500° C. or more by electrifying the resistance element for 15 seconds and then cooling the resistance element by stopping electrification, by using the conductor layer, which is constituted of tungsten and carbon and has a particular composition in an atomic ratio of carbon to tungsten of less than 1:1, as said conductor layer.

That is, concerning the resistance element comprising the laminated and sintered article of the insulating material substrate layer and the conductor layer formed on or embedded in the insulating material substrate layer, the present invention is the composition of said conductor layer which is constituted of tungsten and carbon and has an atomic ratio of tungsten to carbon of 1:0.4 to 1:0.98.

Concerning the resistance element of the present invention, by using the conductor layer constituted of tungsten and carbon in the particular ratio, a thermal expansion coefficient and a strength of said conductor layer become stable. As a result, it becomes possible to use the resistance element 50000 times or more in the cycle test which repeats the operations—increasing the element temperature to 1500° C. or more by electrifying the resistance element for 15 seconds and then cooling the resistance element by stopping the electrification for 15 seconds.

Moreover, by containing further at least one kind of silicon nitride, sillimanite, mullite, aluminum nitride, silicon oxynitride, and SIALON in the conductor layer within a range of predetermined volume content, a junction between the conductor layer and the insulating material substrate layer is strengthened, in addition to the thermal expansion coefficient and the strength of said conductor layer becoming stable. As a result, it becomes possible to use the resistance element 50000 times or more in the cycle test under severe conditions, which repeats the operations—increasing the element temperature to 1550° C. by electrifying the resistance element for 15 seconds and then cooling the resistance element by stopping the electrification for 15 seconds.

The resistance element of the present invention is preferably used for ignitions of gaseous and liquid fuel including e.g. natural gas, propane gas, and kerosene.

DETAILED DESCRIPTION OF PREFERRED EMBODIMENTS

Figure 1:
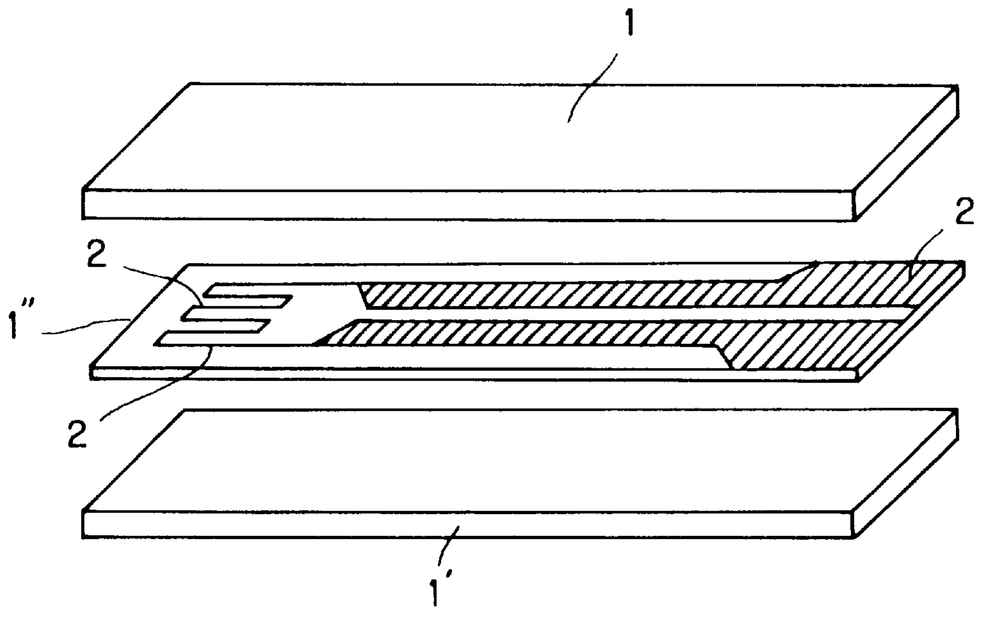
FIG. 1 is a partially exploded perspective view of one sample of a laminated and sintered article in the resistance element of the present invention.

Next, some preferable examples of the present invention will be described.

A resistance element of the present invention comprises a laminated and sintered article of an insulating material substrate layer and a conductor layer formed on or embedded in the insulator substrate layer.

For said insulating material substrate layer, a material selected from known materials conventionally used in a heating element for rapid temperature-rise can be used as necessary. Particularly, a material constituted of SIALON containing silicon nitride, silicon oxide, and aluminum oxide is preferable.

It is known that if silicon nitride ($Si_3N_4$) is oxidized, a pure silicon oxide ($SiO_2$) protection film is formed on the surface of the silicon nitride and as a result oxidation resistance is given to the silicon nitride. But, because it is difficult to sinter the silicon nitride, densification by sintering can not be obtained if the silicon nitride is singly used.

In the present invention, therefore, in order to enhance the densification of a sintered silicon nitride article, it is preferred to use an insulator material comprising SIALON containing 5 to 30 mole, preferably 9 to 21 mole of silicon oxide and 3 to 10 mole, preferably 4 to 8 mole of aluminum oxide with respect to 100 mole of silicon nitride.

When a content of silicon oxide is less than 5 mole, the densification of obtained insulator material is not fully enhanced. When the content of silicon oxide is more than 30 mole, a mechanical strength of the insulator material is lowered, and the insulating material substrate layer is apt to be broken in the cycle test which repeats the operations—increasing the element temperature to 1500° C. by electrifying the resistance element for 15 seconds and then cooling the resistance element by stopping the electrification.

When a content of aluminum oxide is less than 3 mole, the densification of obtained insulator material is not fully enhanced. When the content of aluminum oxide is more than 10 mole, the densification of the insulator material is enhanced, but its oxidation resistance is lowered. In this case, not only the use of the insulator material at a temperature of 1500° C. or more becomes difficult, but the mechanical strength is also lowered.

In addition, as the insulating material substrate layer in the resistance element of the present invention, it is possible to use an insulator material constituted of SIALON containing rare-earth elements. As rare-earth element oxides, for example, oxides including yttrium, samarium, lanthanum, cerium, and neodymium can be named. Above all, yttrium oxide, lanthanum oxide, and cerium oxide are preferable. These rare-earth element oxides may be used singly or in combination of two kinds or more.

On the other hand, as the conductor layer in the resistance element of the present invention, a material with a high melting point, a low thermal expansion coefficient, and a low electrical resistivity is used. Particularly, a material with a melting point of 2000° C. or more, a thermal expansion coefficient of $6.0\times10^{-6}$/° C. or less, and an electrical resistivity of $10^{-5}$ Ω•cm or less is preferable.

Concerning the present invention, as a material like this, a material which is constituted of tungsten and carbon and has an atomic ratio of tungsten to carbon ranging between 1:0.4 and 1:0.98 is used.

It is known that if a material the major constituent of which is SIALON is used for the insulating material substrate layer, a strength of tungsten in the conductor layer is lowered. It is because when the tungsten is sintered or electrified for heating, a part of tungsten is silicified and the thermal expansion coefficient of this silicified tungsten exceeds $6.0\times10^{-6}$/° C. As a result, a deterioration of properties including increase of resistance is likely to be caused by the cycle test which repeats ON/OFF of electrification. But, if tungsten and carbon coexist within the particular range of atomic ratio like the present invention, tungsten becomes stable and the deterioration of properties including the increase of resistance is hardly caused.

If the atomic ratio of tungsten to carbon is less than 0.4, the deterioration of properties including the increase of resistance is likely to be caused by the cycle test which repeats ON/OFF of the electrification. On the other hand, if the atomic ratio of tungsten to carbon is equal to 1 under controlled conditions, no problem is thought to arise because silicification of tungsten is prevented. In reality, however, there are the following problems: That is to say, because normally the conductor layer is formed by printing a paste material, organic binder used for making paste partially remains as residual carbon in the conductor layer when the paste material is sintered. For example, in hot pressing sintering, because about 1 atomic percent of carbon remains, carbon will excessively exist as compared with the composition in the atomic ratio of tungsten to carbon of 1:1. Excellent properties, therefore, can be realized if carbon is subtracted by about 2 atomic percent from the composition in the atomic ratio of tungsten to carbon of 1:1, because no excessive carbon will exist after sintering. An upper limit of the atomic ratio of tungsten to carbon, therefore, is set to be 0.98 as noted above.

In the present invention, for the conductor layer, a material containing further at least one kind of silicon nitride, sillimanite, mullite, aluminum nitride, silicon oxynitride, and SIALON within a range of volume content from 6% to 65% (preferably from 10% to 60%) is preferably used. In this case, the volume content in the present invention is an expression of volume of each occupied substance as a percentage when the substance is in a mixed state at a room temperature (25° C.). To be concrete, for example, concerning a mixed system containing 90 cc of $W_2C$ and 10 cc of aluminum nitride, the volume content of $W_2C$ is 90% and that of aluminum nitride is 10%.

As noted above, if the material contains at least one kind of silicon nitride, sillimanite, mullite, aluminum nitride, silicon oxynitride, and SIALON within a range of volume content from 6% to 65%, properties are further enhanced in reliability tests including said cycle test, and a continuous electrifying test. If the content of said additive substance is less than 6%, an advantage by addition can not be obtained. If the content of said additive substance is more than 65%, resistance temperature properties becomes unstable.

Because every one of said additive substances is an insulating substance, the resistance temperature property of the conductor layer is not influenced. The resistance temperature property of the conductor layer, therefore, is not deteriorated. In addition, every one of said silicon nitride, sillimanite, mullite, aluminum nitride, and silicon oxynitride is a constitutional compound of SIALON. Excellent reliability, therefore, can be obtained because the resistance temperature property of the conductor will not be easily influenced and a junction between the conductor layer and the insulating material substrate layer is improved.

Moreover, concerning silicon oxide which is similarly the constitutional compound of SIALON, its melting point is low—1713° C. Even if the silicon oxide is used as an additive, it is fluidized and transferred from the conductor area to the insulating material substrate layer when sintering at a temperature between 1700 and 1800° C. An advantage by addition, therefore, can not be expected. Furthermore, aluminum oxide may deteriorate the resistance temperature property if amount of addition is large. The aluminum oxide, therefore, is not suitable for the additive substance.

In the next place, concerning a method for producing the resistance element of the present invention, there is no special limitation. Methods which are conventionally used for producing a heating element of ceramics type can be used.

For example, firstly, slurry is prepared from predetermined amounts of α type silicon nitride powder, aluminum oxide powder, and silicon oxynitride powder, which have an average grain size approximately between 0.1 and 1.5 μm, by wet mixing of them by means of a ball mill using a proper solvent, and by adding known binder, dispersing agent and the like if necessary. After that, the slurry is molded into a desired shape by doctor blade method, press forming method, extrusion method and the like.

Next, a predetermined pattern is printed on the surface of the molded article obtained by the above noted method, by using a conductor paste containing tungsten and carbon in the predetermined ratio, and containing at least one kind of silicon nitride, sillimanite, mullite, aluminum nitride, silicon oxynitride, and SIALON within a range of volume content from 6% to 65% if necessary. After that, an unprinted molded article is laminated on the pattern printed molded article, or the pattern printed molded article is rolled and molded into a desired shape, and then the molded substance is sintered. Concerning a method for sintering, there is no special limitation. Known methods, for example, a hot pressing sintering method, an atmospheric pressure sintering method, a nitrogen gas pressure sintering method, a hot isostatic pressing (HIP) sintering method and the like are used. Sintering temperature is normally set to 1900° C. or less (preferably within a range between 1700 and 1800° C.). It is advantageous to perform this sintering under atmosphere which is not oxidized, such as nitrogen gas atmosphere and the like.

Finally, a desired resistance element is obtained by performing surface grinding processing and cutting processing on the sintered article obtained by the above noted method and by mounting electrodes to the conductor layer for the purpose of connecting it with an external power supply.

For the next step, the following examples provide further detailed explanation of the present invention. The present invention, however, shall not be limited by these examples.

EXAMPLE 1

Slurry was prepared from 100 mole of α-$Si_3N_4$ powder, 6.86 mole of $Al_2O_3$ powder, 10 mole of $SiO_2$ powder, and proper amounts of acrylic binder, ethanol, toluene which were added respectively, by mixing them by means of a ball mill. Secondly, after molding this slurry in sheet form by the doctor blade method, a sheet with a thickness of 500 μm was produced by dry processing, and then the sheet was cut into a square with a side length of 60 mm.

Next, a conductor paste the atomic ratio of tungsten to carbon was changed as shown in Table 1 was printed on said sheet. After that, a laminated article was produced by laminating 4 layers of unprinted sheet on both upper and lower surfaces of this printed sheet to form 9 layers totally.

A laminated and sintered article was obtained by sintering this laminated article for 1 hour, under a pressure of 250 kg/cm$^2$ in nitrogen gas atmosphere at 1 atmospheric pressure, at a temperature of 1750° C. FIG. 1 is a partial exploded perspective view of this laminated and sintered article. FIG. 1 shows the state of Conductor layer 2 constituted of tungsten and carbon, which is formed on Insulating material substrate layer 1" constituted of SIALON and is embedded in Insulating material substrate layers 1 and 1' constituted of SIALON.

Figure 2:
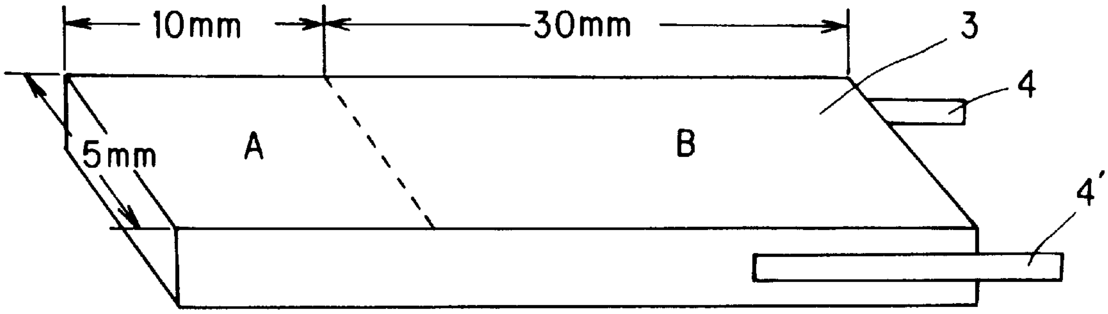
FIG. 2 is a perspective view of the resistance element formed in a preferred example.

Next, this laminated and sintered article was cut by a diamond grindstone. After tungsten-nickel electrodes were sintered on an exposed part of the conductor layer in the cut surface, nickel plating was performed, and then copper wires were soldered to the electrodes to make electrode terminals. As a result, the resistance element was produced. FIG. 2 is a perspective view of the resistance element obtained by the above noted method. In FIG. 2, Sign 3 shows the resistance element, Sign 4 and 4' show the electrodes, Sign A shows the area of heater portion, and Sign B shows the area of lead portion. Furthermore, the electrode portion was placed in a metal mold to shield against outside air.

These resistance elements were evaluated as shown below:

A cycle test was performed. The cycle test, that is to say, repeats the operations—increasing the element temperature to 1500° C. within the first 3 seconds by electrifying the resistance element for 15 seconds and then cooling the resistance element to about a room temperature by stopping the electrification for 15 seconds. A number of times the operations were repeated was counted (a count of 1 time consists of both increasing temperature process and decreasing temperature process), until resistance of the resistance element increased by 10% from initial resistance. As the initial resistance, the resistance at a temperature of 1500° C. at the time of the first electrification was taken. A number of samples was 20 for each, and an average value was applied for the number of times. Results are shown in Table 1. In addition, 50000 times or more are regarded as pass.

TABLE 1

| Carbon/Tungsten (Atomic Ratio) | Number of Cycles |
|---|---|
| 0.1* | 35817 |
| 0.4 | 69550 |
| 0.5 | 78239 |
| 0.98 | 63371 |
| 1.05* | 42754 |

(*: Comparative Example)

As shown in Table 1, all of the resistance elements with carbon/tungsten (atomic ratio) ranging between 0.4 and 0.98 showed numbers of cycles of 50000 times or more.

EXAMPLE 2

While the resistance element produced under the same conditions as Example 1 was continuously electrified to keep its temperature at 1500° C., the length of time spent until resistance of the resistance element increased by 10% from initial resistance was measured. As the initial resistance, the resistance immediately after the temperature reached to 1500° C. from the start of the electrification was taken. A number of samples was 20 for each, and average values were applied. Results are shown in Table 2.

TABLE 2

| Carbon/Tungsten (Atomic Ratio) | Time Length of Continuous Electrification (hours) |
|---|---|
| 0.1* | 2154 |
| 0.4 | 6731 |
| 0.5 | 8239 |
| 0.98 | 7372 |
| 1.05* | 2754 |

(*: Comparative Example)

As shown in Table 2, all of the resistance elements with carbon/tungsten (atomic ratio) ranging between 0.4 and 0.98 showed time lengths of continuous electrification of 6000 hours or more and were more preferable than those out of said carbon/tungsten atomic ratio.

EXAMPLE 3

Slurry was prepared from 100 mole of α-$Si_3N_4$ powder, 6.8 mole of $Al_2O_3$ powder, 9.3 mole of $SiO_2$ powder, and proper amounts of acrylic binder, ethanol, toluene which were added respectively, by mixing them by means of a ball mill. Secondly, after molding this slurry in sheet form by the doctor blade method, a sheet with a thickness of 500 $\mu$m was produced by dry processing, and then the sheet was cut into a square with a side length of 60 mm.

Next, the atomic ratio of tungsten to carbon was fixed to be 1:0.5, and 19 kinds of conductor pastes were prepared by adding silicon nitride, sillimanite, mullite, aluminum nitride, silicon oxynitride, and SIALON in additive amounts as shown in Table 3. This conductor paste was printed on said sheet. After that, a laminated article was produced by laminating 2 layers of unprinted sheet on both upper and lower surfaces of this printed sheet to form 5 layers totally. Furthermore, the following is the compositions of SIALON (1) and (2) shown respectively:

| | |
|---|---|
| **Composition of SIALON (1)** | |
| Silicon nitride | 81 mole |
| Silicon oxide | 16 mole |
| Aluminum oxide | 3 mole |
| **Composition of SIALON (2)** | |
| Silicon nitride | 83 mole |
| Silicon oxide | 9 mole |
| Aluminum oxide | 8 mole |

A laminated and sintered article shown in FIG. 1 was obtained by sintering this laminated article for 1 hour, under a pressure of 250 kg/cm$^2$ in nitrogen gas atmosphere at 1 atmospheric pressure, at a temperature of 1700° C.

Next, this laminated and sintered article was cut by a diamond grindstone. After tungsten-nickel electrodes were sintered on an exposed part of the conductor layer in the cut surface, nickel plating was performed, and then copper wires were soldered to the electrodes to make electrode terminals. As a result, the resistance element as shown in FIG. 2 was produced. Furthermore, the electrode portion was placed in a metal mold to shield against outside air.

These resistance elements were evaluated as shown below:

A cycle test was performed under severer conditions than those in Example 1. The cycle test, that is to say, repeats the operations—increasing the element temperature to 1550° C. within the first 3 seconds by electrifying the resistance element for 15 seconds and then cooling the resistance element to about a room temperature by stopping the electrification for 15 seconds. A number of times the operations were repeated was counted (a count of 1 time consists of both increasing temperature process and decreasing temperature process), until resistance of the resistance element increased by 10% from initial resistance. As the initial resistance, the resistance at a temperature of 1550° C. at the time of the first electrification was taken. A number of samples was 20 for each, and an average value was applied for the number of times. Results are shown in Table 3. In addition, 50000 times or more is regarded as pass.

TABLE 3

| Conductor Layer (Carbon/Tungsten = 0.5) | | |
|---|---|---|
| Additive Substance | Additive Amount (Volume %) | Number of Cycles |
| SIALON (1) | 5* | 37570 |
| SIALON (1) | 6 | 52598 |
| SIALON (1) | 10 | 286681 |
| SIALON (1) | 30 | 875893 |
| SIALON (1) | 60 | 849548 |
| SIALON (1) | 65 | 811978 |
| SIALON (1) | 70* | Resistance is unstable. |
| SIALON (2) | 5* | 34768 |
| SIALON (2) | 6 | 50066 |
| SIALON (2) | 10 | 315410 |
| SIALON (2) | 30 | 889366 |
| SIALON (2) | 60 | 842443 |
| SIALON (2) | 65 | 807675 |
| SIALON (2) | 70* | Resistance is unstable. |
| Silicon nitride | 30 | 875863 |
| Silicon oxynitride | 30 | 826273 |
| Sillimanite | 30 | 881529 |
| Mullite | 30 | 835572 |
| Aluminum nitride | 30 | 819366 |

(*: Comparative Example)

As shown in Table 3, all of the resistance elements containing SIALON (1), SIALON (2), silicon nitride, sillimanite, mullite, aluminum nitride, or silicon oxynitride in the conductor layer, within a range of volume content from 6% to 65%, showed numbers of cycles of 50000 times or more even in the severer cycle test at 1550° C. than that in Example 1.

EXAMPLE 4

While the resistance element produced under the same conditions as Example 3 was continuously electrified to keep its temperature at 1550° C., the length of time spent until resistance of the resistance element increased by 10% from initial resistance was measured. As the initial resistance, the resistance immediately after the temperature reached to 1550° C. from the start of the electrification was taken. A number of samples was 20 for each, and average values were applied. Results are shown in Table 4.

TABLE 4

| Conductor Layer (Carbon/Tungsten = 0.5) | | Time Length of |
|---|---|---|
| Additive Substance | Additive Amount (Volume %) | Continuous Electrification (hours) |
| SIALON (1) | 5* | 2715 |
| SIALON (1) | 6 | 5099 |
| SIALON (1) | 10 | 6369 |
| SIALON (1) | 30 | 8450 |
| SIALON (1) | 60 | 7867 |
| SIALON (1) | 65 | 6701 |
| SIALON (1) | 70* | Resistance is unstable. |
| SIALON (2) | 5* | 2529 |
| SIALON (2) | 6 | 5002 |
| SIALON (2) | 10 | 5998 |

TABLE 4-continued

| Conductor Layer (Carbon/Tungsten = 0.5) | | Time Length of |
| --- | --- | --- |
| Additive Substance | Additive Amount (Volume %) | Continuous Electrification (hours) |
| SIALON (2) | 30 | 8024 |
| SIALON (2) | 60 | 7775 |
| SIALON (2) | 65 | 7277 |
| SIALON (2) | 70* | Resistance is unstable. |
| Silicon nitride | 30 | 8010 |
| Silicon oxynitride | 30 | 8101 |
| Sillimanite | 30 | 8901 |
| Mullite | 30 | 7965 |
| Aluminum nitride | 30 | 7227 |

(*: Comparative Example)

As shown in Table 4, all of the resistance elements containing SIALON (1), SIALON (2), silicon nitride, sillimanite, mullite, aluminum nitride, or silicon oxynitride in the conductor layer, within a range of volume content from 6% to 65%, showed time lengths of continuous electrification of 5000 hours or more even in the severer continuous electrification test at 1550° C. than that in Example 1.

EXAMPLE 5

Slurry was prepared from 100 mole of $\alpha$-$Si_3N_4$ powder, 7 mole of $Al_2O_3$ powder, 21 mole of $SiO_2$ powder, and proper amounts of acrylic binder, ethanol, toluene which were added respectively, by mixing them by means of a ball mill. Secondly, after molding this slurry in sheet form by the doctor blade method, a sheet with a thickness of 500 $\mu$m was produced by dry processing, and then the sheet was cut into a square with a side length of 60 mm.

For the next step, the atomic ratio of tungsten to carbon was fixed to be 1:0.5, and a conductor paste was prepared by adding SIALON with the same constituent as SIALON (1) used in Example 3 in such a manner that the volume content of SIALON became 40%. This conductor paste was printed on said sheet. After that, a laminated article was produced by laminating 2 layers of unprinted sheet on both upper and lower surfaces of this printed sheet to form 5 layers totally.

A laminated and sintered article shown in FIG. 1 was obtained by sintering this laminated article for 1 hour, under a pressure of 250 kg/$cm^2$ in nitrogen gas atmosphere at 1 atmospheric pressure, at a temperature of 1700° C.

Next, this laminated and sintered article was cut by a diamond grindstone. After tungsten-nickel electrodes were sintered on an exposed part of the conductor layer in the cut surface, nickel plating was performed, and then copper wires were soldered to the electrodes to make electrode terminals. As a result, the resistance element as shown in FIG. 2 was produced. Furthermore, the electrode portion was placed in a metal mold to shield against outside air.

A cycle test was performed under the conditions similar to those in Example 3. The number of times until resistance of the resistance element increased by 10% from initial resistance was counted. As a result, this resistance element showed 978302 times in the cycle test at a temperature of 1550° C. which was severer than Example 1. The result was extremely favorable.

EXAMPLE 6

While the resistance element produced under the same conditions as Example 5 was continuously electrified to keep its temperature at 1550° C., the length of time spent until resistance of the resistance element increased by 10% from initial resistance was measured. As the initial resistance, the resistance immediately after the temperature reached to 1550° C. from the start of the electrification was taken. A number of samples was 20 for each, and average values were applied. As a result, this resistance element showed 9718 hours in the continuous electrification test at a temperature of 1550° C. which was severer than Example 1. The result was extremely favorable.

What is claimed is:

1. A resistance element comprising a laminated and sintered article of an insulating material substrate layer, and a conductor layer having a high melting point, a low thermal expansion coefficient and a low electrical resistivity which is formed on or embedded in the insulating material substrate layer, wherein said conductor layer comprises tungsten and carbon, and an atomic ratio of tungsten to carbon is in the range of 1:0.4 to 1:0.98.

2. The resistance element according to claim 1, wherein said insulating material substrate layer comprises SIALON containing 5 to 30 mole of silicon oxide and 3 to 10 mole of aluminum oxide with respect to 100 mole of silicon nitride.

3. The resistance element according to claim 1, wherein said conductor layer contains 6% to 65% by volume of at least one selected from the group consisting of silicon nitride, sillimanite, mullite, aluminum nitride, silicon oxynitride and SIALON.

4. The resistance element according to claim 3, wherein said insulating material substrate layer comprises SIALON containing 5 to 30 mole of silicon oxide and 3 to 10 mole of aluminum oxide with respect to 100 mole of silicon nitride.

* * * * *